United States Patent [19]
Toyokura et al.

[11] Patent Number: 5,293,596
[45] Date of Patent: Mar. 8, 1994

[54] MULTIDIMENSIONAL ADDRESS GENERATOR AND A SYSTEM FOR CONTROLLING THE GENERATOR

[75] Inventors: Masaki Toyokura; Kunitoshi Aono, both of Osaka; Toshiyuki Araki, Kyoto, all of Japan

[73] Assignee: Matsushita Electric Industrial Co., Ltd., Osaka, Japan

[21] Appl. No.: 658,154

[22] Filed: Feb. 20, 1991

[30] Foreign Application Priority Data

Feb. 21, 1990 [JP] Japan .................................. 2-41424

[51] Int. Cl.$^5$ ............................................. G06F 12/00
[52] U.S. Cl. ............................ 395/400; 364/DIG. 1; 364/251; 364/254; 364/254.8; 364/258
[58] Field of Search .................... 395/400, 425

[56] References Cited

U.S. PATENT DOCUMENTS

| | | | |
|---|---|---|---|
| 4,809,156 | 2/1989 | Taber | 395/400 |
| 4,819,152 | 4/1989 | Deerfield et al. | 395/400 |
| 4,860,109 | 8/1989 | Kawakami et al. | |

FOREIGN PATENT DOCUMENTS 0346489 12/1989 European Pat. Off. .
2163280 2/1986 United Kingdom .

*Primary Examiner*—Rebecca L. Rudolph
*Attorney, Agent, or Firm*—Lowe, Price, LeBlanc & Becker

[57] ABSTRACT

A multidimensional address generator for generating one-dimensional addresses respectively corresponding to $P_1 \times P_2 \times \ldots \times P_N$ data of a predetermined region of an N-dimensional entire data array (N is a positive integer larger than one) which has $Q_1 \times Q_2 \times \ldots \times Q_N$ data ($P_1, \ldots$ and $P_N$ and $Q_1, \ldots$ and $Q_N$ are positive integers and $P_1 \leq Q_1, \ldots$ and $P_N \leq Q_N$). The generator comprises a first to third multiplexers, an adder and a first to Nth accumulating registers. In the generator, the first multiplexer selects one of a first to Nth increments respectively corresponding to a first to Nth directions, in which data to successively be accessed are arranged. Further, the second multiplexer selects one of data stored in the first to Nth accumulating registers, and the third multiplexer selects between the start address and an output of the adder. Moreover, data selected by the first multiplexer is added by the adder to data selected by the second multiplexer, and data selected by the third multiplexer is inputted to the first to Nth accumulating registers. Furthermore, a start address is written to the first to Nth accumulating registers when the address generator is activated. Moreover, the first increment is added to the data held in the first accumulating register in each of Cycles 1 to $(P_1-1)$ and ... and Cycles $(P_N P_{N-1} \ldots P_2-1)P_1+1$ to $(P_N P_{N-1} \ldots P_2 P_1-1)$, the first increment is added to the data held in the first accumulating register, and a result is written thereto. Additionally, an nth increment ($n=2, 3, \ldots, N$) is added to the data held in the nth accumulating register, and a result is written to the first to nth accumulating registers, every $P_{n-1} P_{n-2} \ldots P_1$ cycles during Cycles $P_n P_{n-1} P_{n-2} \ldots P_1$ to $(P_n-1)P_{n-1} P_{n-2} \ldots P_1$ and so on. The data finally obtained in the first accumulating register is outputted. Consequently, an operation of accessing a plurality of multidimensional data can be performed easily and quickly.

4 Claims, 10 Drawing Sheets

FIG. 6(a)

|   | 0 | 1 | 2 | 3 | 4 | 5 |
|---|---|---|---|---|---|---|
|   | 6 | 7 (0) | 8 (1) | 9 (2) | 10 (3) | 11 |
|   | 12 | 13 (4) | 14 (5) | 15 (6) | 16 (7) | 17 |
|   | 18 | 19 (8) | 20 (9) | 21 (10) | 22 (11) | 23 |
|   | 24 | 25 (12) | 26 (13) | 27 (14) | 28 (15) | 29 |
|   | 30 | 31 | 32 | 33 | 34 | 35 |
|   | 36 | 37 | 38 | 39 | 40 | 41 |

|   | 0 | 1 | 2 | 3 | 4 | 5 |
|---|---|---|---|---|---|---|
|   | 6 | 7 (0) | 8 (4) | 9 (8) | 10 (12) | 11 |
|   | 12 | 13 (1) | 14 (5) | 15 (9) | 16 (13) | 17 |
|   | 18 | 19 (2) | 20 (6) | 21 (10) | 22 (14) | 23 |
|   | 24 | 25 (3) | 26 (7) | 27 (11) | 28 (15) | 29 |
|   | 30 | 31 | 32 | 33 | 34 | 35 |
|   | 36 | 37 | 38 | 39 | 40 | 41 |

| 0 | 1 | 2 | 3 | 4 | 5 | 6 | 7 | 8 | 9 | 10 |
|---|---|---|---|---|---|---|---|---|---|---|
| 11 | 12 (0) | 13 (1) | 14 (2) | 15 (9) | 16 (10) | 17 (11) | 18 (18) | 19 (19) | 20 (20) | 21 |
| 22 | 23 (3) | 24 (4) | 25 (5) | 26 (12) | 27 (13) | 28 (14) | 29 (21) | 30 (22) | 31 (23) | 32 |
| 33 | 34 (6) | 35 (7) | 36 (8) | 37 (15) | 38 (16) | 39 (17) | 40 (24) | 41 (25) | 42 (26) | 43 |
| 44 | 45 | 46 | 47 | 48 | 49 | 50 | 51 | 52 | 53 | 54 |

| 0 | 1 | 2 (0) | 3 (1) | 4 (2) | 5 | 6 | 7 | 8 | 9 | 10 |
|---|---|---|---|---|---|---|---|---|---|---|
| 11 | 12 | 13 (3) | 14 (4) | 15 (5)(9) | 16 (10) | 17 (11) | 18 | 19 | 20 | 21 |
| 22 | 23 | 24 (6) | 25 (7) | 26 (8)(12) | 27 (13) | 28 (14)(18) | 29 (19) | 30 (20) | 31 | 32 |
| 33 | 34 | 35 | 36 | 37 (15) | 38 (16) | 39 (17)(21) | 40 (22) | 41 (23) | 42 | 43 |
| 44 | 45 | 46 | 47 | 48 | 49 | 50 (24) | 51 (25) | 52 (26) | 53 | 54 |

74-1   74-2   74-3   73

MULTIDIMENSIONAL ADDRESS GENERATOR AND A SYSTEM FOR CONTROLLING THE GENERATOR

BACKGROUND OF THE INVENTION

1. Field of the Invention

This invention generally relates to an address generator for generating addresses, at which data to be accessed is stored, assigned to locations of a memory provided in a digital signal processor (hereunder abbreviated as a DSP) and of an external storage, and more particularly to a multidimensional address generator for generating addresses assigned to locations of a memory, in which data (e.g., image data) to be accessed is physically arranged as a one-dimensional array is stored, when accessing and treating the data as a multidimensional array (i.e., an array of two or more dimensions).

2. Description of the Related Art

Generally, when two-dimensional data such as image data is stored in a memory, it is required to perform a mapping of the two-dimensional data into a one-dimensional address space. In case of image data, a mapping of image data to one-dimensional addresses is usually carried out in accordance with order of raster scan of positions corresponding to the image data. Further, when the image data is treated as two-dimensional data, it is often to extract a part of image data corresponding to picture elements (i.e., pixels) of a rectangular region from all of the image data and use the extracted part of the image data for various image processing. In case of image data which is a typical example of two-dimensional data, such rectangular regions including, for instance, 3×3 or 8×8 pixels are employed as processing objects of various picture processing to be performed by using image data corresponding to pixels of a local neighborhood of a pixel and as objects of image data compression to be effected by dividing an entire image into image blocks.

Referring to FIGS. 4(a), (b) and (c), there is illustrated the manner of mapping image data into a one-dimensional address space. In these figures, reference numeral 41 indicates an entire image composed of a rectangular region including $Q_1 \times Q_2$ pixels (incidentally, reference characters $Q_1$ and $Q_2$ denote positive integers); 42 a rectangular region including $P_1 \times P_2$ pixels to be accessed (incidentally, reference characters $P_1$ and $P_2$ designate positive integers and $P_1 \leq Q_1$ and $P_2 \leq Q_2$); 43A an actual memory map corresponding to the entire image; and 43B another actual memory map corresponding to the rectangular region 42 to be accessed.

As illustrated in FIGS. 4(a), (b) and (c), the rectangular region 42 arbitrarily extracted from the entire image comprised of the rectangular region including $Q_1 \times Q_2$ pixels is divided and arrayed in a memory. Thus, in order to successively access image data included in the rectangular region 42 to be accessed, and address generator for generating addresses is needed. Further, a direct memory access (DMA) transfer of image data from an external image memory to an internal image memory of a DSP is performed by using this address generator, and then the DSP effects various processing of the transferred image data in synchronization with the access by the address generator to the image memories.

Referring next to FIG. 10, there is shown an example of a conventional two-dimensional address generator. Here, as illustrated in FIG. 4, a rectangular region including $P_1 \times P_2$ pixels in an entire image comprised of a rectangular region including $Q_1 \times Q_2$ is employed as an object to be accessed.

In FIG. 10, reference numeral 101 denotes a first increment setting device for setting an increment to be used to calculate addresses assigned to locations at which image data corresponding to pixels arranged in a first scanning direction (i.e., a secondary scanning direction (e.g., X-direction as viewed in FIG. 4(a))) to be accessed is stored; 102 and adder; 103 an accumulating register; 104 a start-address setting device for setting and address (hereunder referred to simply as a start address) from which an operation of accessing image data is started; and 105 a control circuit. Incidentally, in the instant specification, a direction, in which elements such as pixels to be accessed are arranged, will be referred to as a scanning direction.

Hereinafter, an operation of this conventional two-dimensional address generator will be described with reference to FIG. 10.

First, in Cycle 0, data (hereunder referred to as start-address data) indicating an address, which corresponds to image data 0 of a pixel to first be accessed in the rectangular region 42 of FIG. 4(a), of the map 43A of FIG. 4(b) is set by the start-address setting device 104 in the accumulating register 103 as an initial value of an address (i.e., a start address) corresponding to image data of a pixel to be accessed.

Thereafter, in Cycles $P_1, 2P_1, \ldots$ and $(P_2-1)P_1$, the start-address setting device sets addresses of locations, at which image data $P_1, 2P_1, \ldots$ and $(P_2-1)P_1$ are stored, of an image memory, in the accumulating register 103, respectively, as a start address. Further, in each of Cycles $1, \ldots$ and $(P_1-1)$, data held in the accumulating register 103 is added to the first increment set by the first increment data setting device 101 by the adder 102, and moreover a result of the addition is written to the accumulating register 103. Similarly, an addition of data held in the accumulating register 103 to the first increment, as well as a writing of a result of the addition to the accumulating register 103, is performed in each of Cycles $(P_1+1)$ to $(2P_1-1)$ and $(P_2-n\ 1)P_1$ to $(P_2P_1-1)$. Finally, the conventional two-dimensional address generator outputs data obtained in the accumulating register 103 as a result of performing operations of Cycles 0 to $(P_2P_1-1)$.

With the configuration of FIG. 10, the conventional address generator, however, needs to calculate a start address and set the calculated start address in the accumulating register 103 every time the scanning direction is changed. Thus, the conventional address generator has a drawback in that many number of cycles are needed to generate addresses required to access multidimensional data such as image data. The present invention is created to eliminate the above described drawback of the conventional address generator.

Accordingly, and object of the present invention is to provide a multidimensional address generator which can access multidimensional data by performing a relatively small number of cycles.

Further, another object of the present invention is to provide a control system for controlling a multidimensional address generator such that the address generator can have successive accesses to a specific address of a memory (for example, can read data stored at a specific address of a memory, then perform an operation on the read data and further write a result of the operation to the specific address of the memory).

SUMMARY OF THE INVENTION

To achieve the foregoing object and in accordance with a first aspect of the present invention, there is provided a multidimensional address generator which comprises a first and second, . . . and to Nth (N denotes a positive integer larger than one) accumulating registers, which correspond to a first to Nth scanning directions and are independent from each other, in addition to another accumulating register to which addresses of a memory actually used to access image data are written. Further, in case of this multidimensional address generator, when a scanning direction is changed into a different one, an address corresponding to image data of a pixel to be accessed is calculated by adding an increment corresponding to the different scanning direction to data held in the accumulating register corresponding to the different scanning direction.

Namely, the multidimensional address generator generates addresses of data of a region of a memory (hereunder referred to as a parallelepiped region) composed of $P_1 \times P_2 \times \ldots \times P_N$ addresses in another parallelepiped region composed of $Q_1 \times Q_2 \times \ldots \times Q_N$ addresses ($P_1, P_2, \ldots$ and $P_N$ and $Q_1, Q_2, \ldots$ and $Q_N$ denote positive integers, and $P_1 \leq Q_1, P_2 \leq Q_2, \ldots$ and $P_N \leq Q_N$) and has a first to third multiplexers and the first to Nth accumulating registers.

First, in this address generator, the first multiplexer selects one of the first to Nth increments respectively corresponding to the first to Nth scanning directions. On the other hand, the second multiplexer selects among data held in the first accumulating register, data held in the second accumulating register, . . . and data held in the Nth accumulating registers. Further, the third multiplexer selects either of start-address data representing a start address and an output of the adder. Then, the data selected by the first multiplexer is added to the data selected by the second multiplexer. Moreover, the data selected by the third multiplexer is inputted to the first to Nth accumulating registers. Furthermore, in a sequence of cycles denominated Cycles 0 to $(P_N P_{N-1} \ldots P_2 P_1 - 1)$ of a cyclic access operation of accessing the $P_1 \times P_2 \times \ldots \times P_N$ data stored in the memory, which operation is performed by a processor, during Cycle 0 the start-address data is written to the first to Nth accumulating registers. Thereafter, in each of Cycles 1 to $(P_1-1)$, $(P_1+1)$ to $(2P_1-1)$ and $\{(P_N P_{N-1} \ldots P_2-1)P_1+1\}$ to $(P_N P_{N-1} \ldots P_2 P_1-1)$, the data held in the first accumulating register is added to the first increment corresponding to the first scanning direction and a result of this addition is written to the first accumulating register. Further, the data held in the nth accumulating register (n=2, 3, . . . N) is added to the nth increment corresponding to the nth scanning direction and moreover a result of the addition is written to the first to nth accumulating registers every $P_{n-1}P_{n-2} \ldots P_2 P_1$ cycles in a period from Cycle $P_n P_{n-1} P_{n-2} \ldots P_1$ to Cycle $(P_n-1)P_{n-1}P_{n-2} \ldots P_2 P_1$, in another period from Cycle $(P_n+1)P_{n-1}P_{n-2} \ldots P_2 P_1$ to Cycle $(2P_n-1)P_{n-1}P_{n-2} \ldots P_2 P_1$ and in still another period from Cycle $((P_N P_{N-1} \ldots P_{n+1}-1)P_n+1)P_{n-1}P_{n-2} \ldots P_2 P_1$ to Cycle $((P_N P_{N-1} \ldots P_{n+1}P_n-1)P_{n-1}P_{n-2} \ldots P_2 P_1$. This is performed for all possible values of n. Finally, a value of data thus obtained in the first accumulating register as a result of operations from Cycles 0 to $(P_N P_{N-1} \ldots P_1-1)$ is outputted therefrom.

Thus, in case of the multidimensional address generator according to the first aspect of the present invention, each of N accumulating registers maintains a result of a computation of an address assigned to a location, at which one of data arranged in a scanning direction corresponding thereto in a multidimensional array to currently be accessed is stored, until data arranged in the same scanning direction in the multidimensional array are accessed next time. This results in that there is no necessity of re-calculating a start address and of setting start-address data indicating the re-calculated start address every time the scanning direction is changed. Thus, $P_1 \times P_2 \times \ldots \times P_N$ data of a multidimensional region included in the entire multidimensional data array comprised of $Q_1 \times Q_2 \times \ldots \times Q_N$ data can successively be accessed without re-calculation of a start address. As a consequence, an operation of accessing a plurality of data of a multidimensional array can be performed easily and quickly.

Further, in accordance with a second aspect of the present invention, there is provided a two-dimensional address generator including a first and second accumulating registers. To the first accumulating register, addresses to actually be accessed are written. Moreover, and address, which is to first be accessed, of a row or a column of a two-dimensional data array is written to the second accumulating register. In this two-dimensional address generator, addresses of the next row or column to be accessed are computed by adding data held in the second accumulating register to a second increment corresponding to the second scanning direction.

Namely, this two-dimensional address generator generates addresses serially assigned in a one-dimensional manner to two-dimensional data stored at locations of a parallelogram region of a memory having $P_1 \times P_2$ data included in an entire parallelogram region including $Q_1 \times Q_2$ data to be accessed. Incidentally, $P_1$ and $P_2$ denote positive integers, and $P_1 \leq Q_1$ and $P_2 \leq Q_2$. To this end, this two-dimensional address generator is provided with a first, second and third multiplexers, an adder and a first and second accumulating registers.

Further, one of the first and second increments respectively corresponding to the first and second scanning directions is selected by the first multiplexer. Moreover, the second multiplexer selects between the data from the first accumulating register and that from the second accumulating register. Furthermore, the third multiplexer selects between the start-address data and an output of the adder. Then, the adder adds the data selected by the first multiplexer to the data selected by the second multiplexer. Further, a result of this addition is made by the third multiplexer to be inputted to the first and second accumulating registers. In addition, in Cycle 0, the start address is set in the first and second accumulating registers. Furthermore, the data held in the first accumulating register is added to the first increment corresponding to the first scanning direction every cycle in a period from Cycles 1 to $(P_1-1)$, in another period from Cycles $(P_1+1)$ to $(2P_1-1)$ and in still another period from Cycles $(P_2-1)P_1+1$ to $(P_2 P_1-1)$. Subsequently, a result of the addition is written to the first accumulating register in each of these cycles. Additionally, every $P_1$ cycles, (namely, in Cycles $P_1, 2P_1, \ldots$ and $(P_2-1)P_1$), the data held in the second accumulating register is added to the second increment corresponding to the second scanning direction and then a result of the addition is written to both of the first and second accumulating registers. Thus, data obtained in the first accumulating register as a result of each of Cycles 0 to $(P_2P_1-1)$ is outputted from this two-dimensional address generator.

Thus, the second accumulating register accumulates the second increment to the start address and maintains a result of the accumulation until a data element of the next column or row of an array is accessed. Therefore, it is unnecessary to calculate and set a new start address every time a row or a column of data to be accessed is changed. Consequently, $P_1 \times P_2$ two-dimensional data of a parallelogram region which are part of $Q_1 \times Q_2$ data of a larger parallelogram region can successively be accessed. As a result, a plurality of two-dimensional data can be accessed easily and quickly.

Furthermore, in accordance with a third aspect of the present invention, there is provided a control system for controlling a multidimensional address generator, which is constructed in such a manner to control progress in cycles by instructions.

Namely, this control system for controlling a multidimensional address generator is characterized by performing a control operation on the multidimensional address generator as follows. Namely, in case where a first mode of an instruction is detected, the control system controls the multidimensional address generator such that the multidimensional address generator advances in operation by one cycle after an output of the multidimensional address is used. In contrast, in case where a second mode of an instruction is detected, the control system controls the multidimensional address generator in such a manner to inhibit the multidimensional address generator from advancing in operation after an output of the multidimensional address is used.

Thus, in case of employing the control system in accordance with the third aspect of the present invention, progress of cycles in operation of a multidimensional address generator can be controlled in accordance with modes of an instruction. Therefore, a plurality of accesses to a specific address can successively be perform in case where, for example, a reading of data stored at a specific address, an operation of the data read out of the specific address and a writing of a result of the operation to the specific address are successively effected. As a result, the multidimensional address generator can be used when an instruction is executed.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 6(a) and 6(b) are diagrams each for illustrating a practical operation of generating addresses, which are used to access image data of a rectangular region to be accessed, by the two-dimensional address generator of FIG. 2;

FIGS. 7(a) and 7(b) are diagrams each for illustrating a practical operation of generating addresses, which are used to access image data of a rectangular region to be accessed, by a three-dimensional address generator of FIG. 8;

DETAILED DESCRIPTION OF THE PREFERRED EMBODIMENTS

Hereinafter, preferred embodiments of the present invention will be described in detail by referring to the accompanying drawings.

Figure 1:
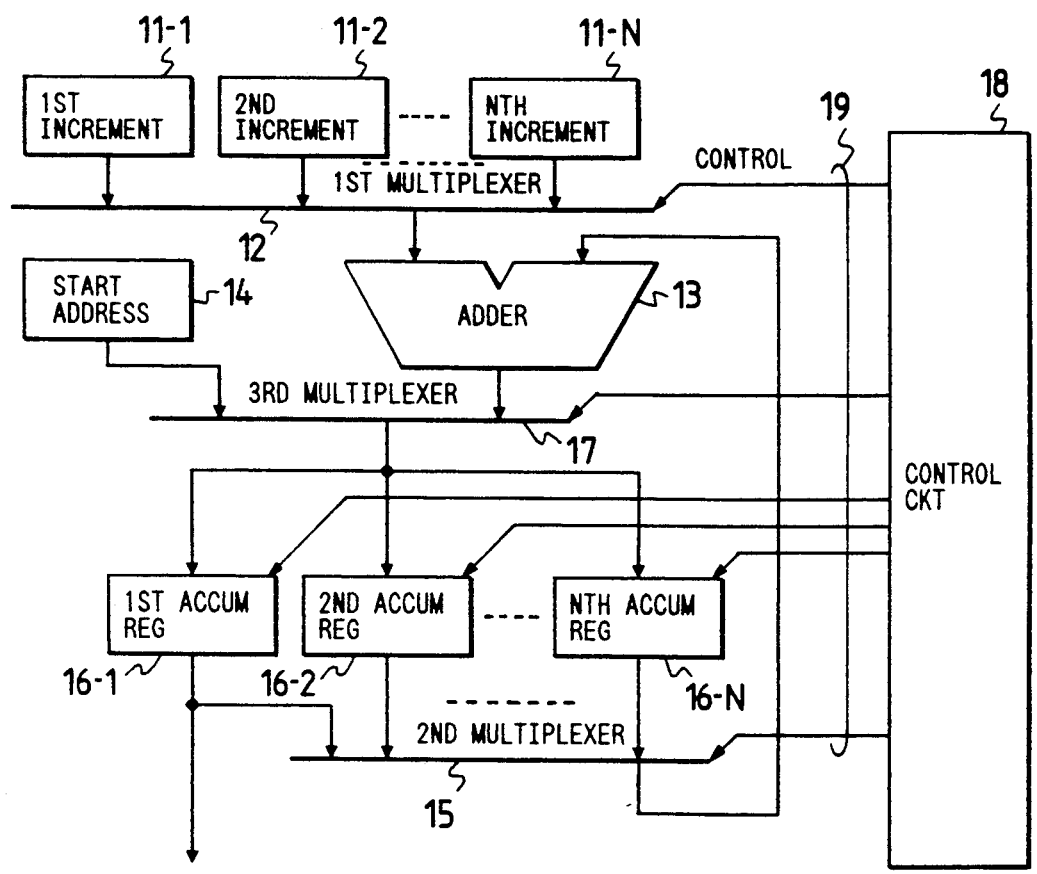
FIG. 1 is a schematic block diagram for showing the construction of an example of a multidimensional address generator embodying the present invention.

Referring first to FIG. 1, there is shown a multidimensional address generator embodying the present invention. In FIG. 1, reference characters 11-1, 11-2, ... and 11-N respectively denote devices for setting a first, second, ... and Nth increments therein; 12 a first multiplexer; 13 an adder; 14 a device for setting a start address therein; 15 a second multiplexer; 16-1, 16-2, ... and 16-N respectively indicate a first, second, ... and Nth accumulating registers; 17 a third multiplexer; 18 a control circuit; and 19 a control signal. Incidentally, the first, second, ... and Nth increments corresponds to a first, second, ... and Nth scanning directions, respectively. Further, in the following description, the multiplexer address generator and image data to be accessed will be described as a two-dimensional address generator and two-dimensional data, respectively, for simplicity and brevity of description.

Figure 2:
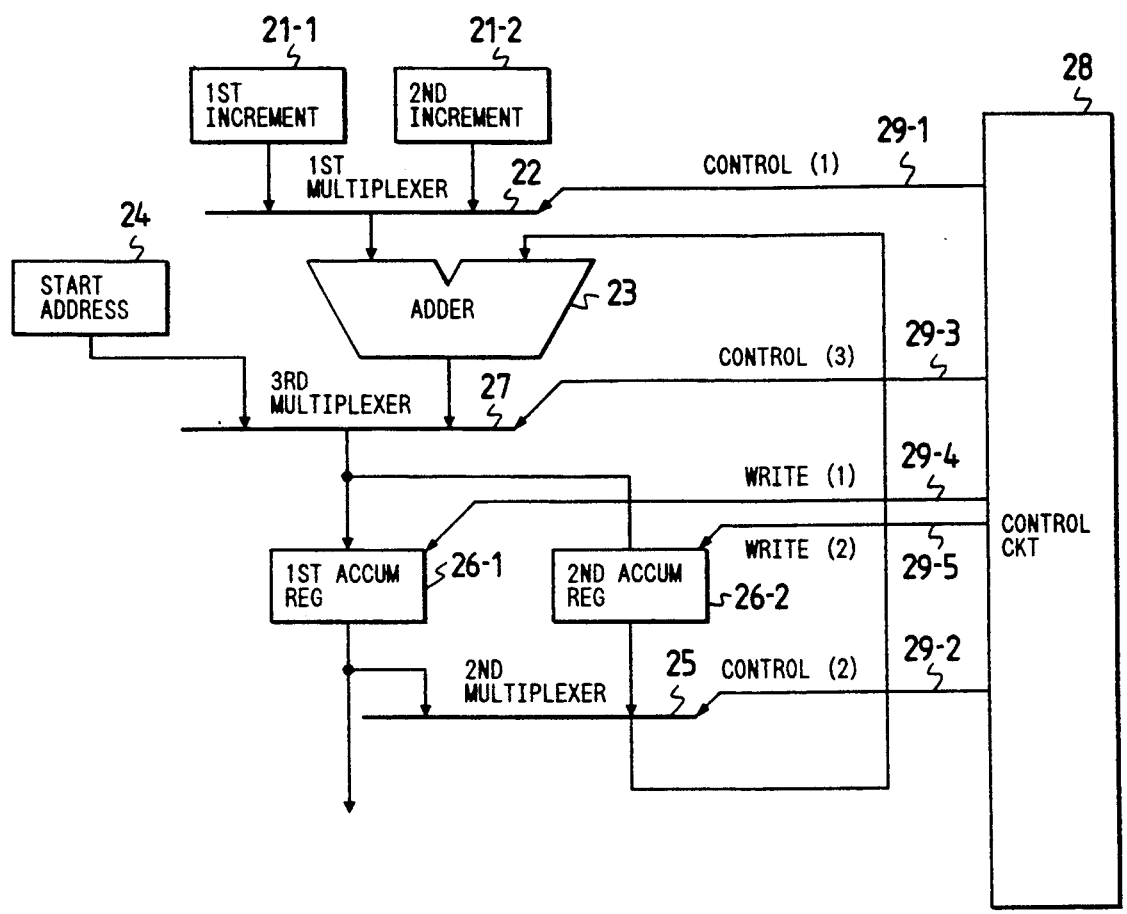
FIG. 2 is a schematic block diagram for showing the construction of an example of a two-dimensional address generator embodying the present invention.
Figure 4A:
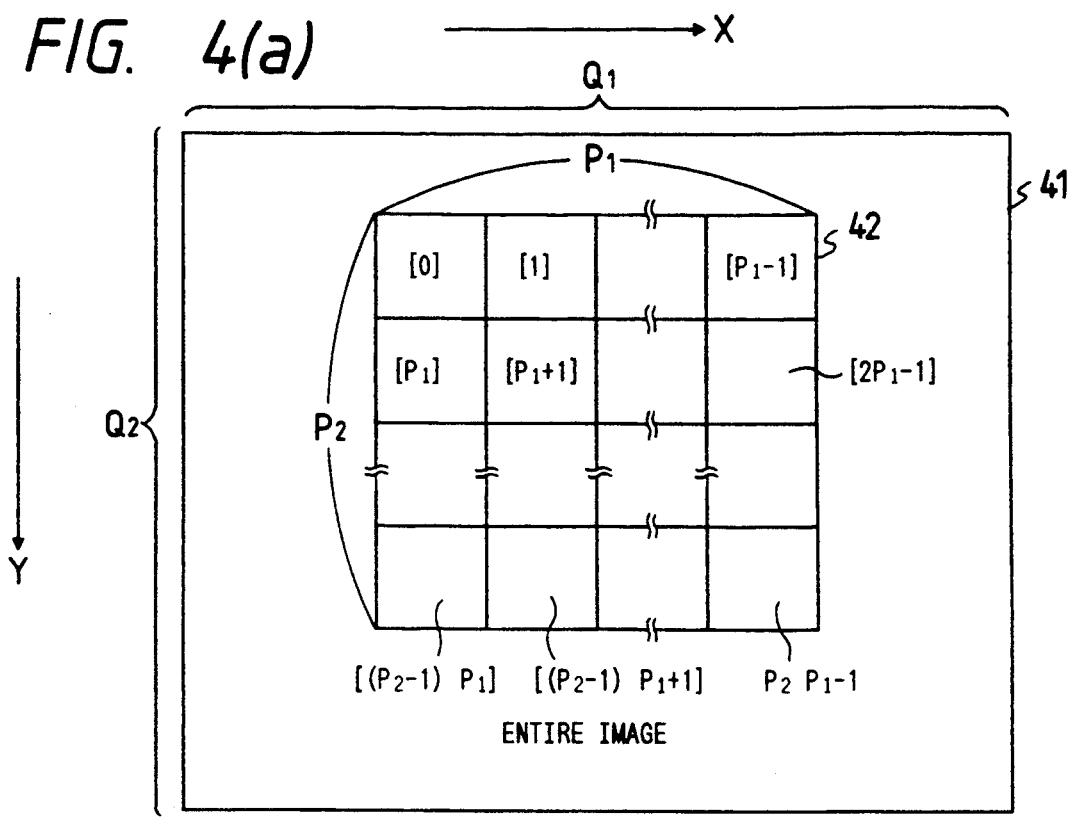
FIG. 4(a) is a diagram for illustrating examples of rectangular regions of image data to be accessed.

Referring next to FIG. 2, there is illustrated an example of such a two-dimensional address generator according to the present invention. In FIG. 2, reference character 21-1 designates a device for setting a first increment DX corresponding to a first scanning direction (i.e., X-direction illustrated in FIG. 4(a)) therein; 21-2 a device for setting a second increment DY corresponding to a second scanning direction (i.e., Y-direction shown in FIG. 4(a)) therein; 22 a first multiplexer; 23 an adder; 24 a start-address setting device for setting a start address SA therein; 25 a second multiplexer; 26-1 a first accumulating register; 26-2 a second accumulating register; 27 a third multiplexer; 28 a control circuit; 29-1 Control Signal (1); 29-2 Control Signal (2); 29-3

Control Signal (3); 29-4 Writing Signal (1); and 29-5 Writing Signal (2).

Hereinafter, an operation of this two-dimensional address generator will be described. Incidentally, it is supposed that an object to be accessed is a given rectangular region having $P_1 \times P_2$ data included an entire region having $Q_1 \times Q_2$ ($P_1$, $P_2$, $Q_1$ and $Q_2$ are positive integers and $P_1 \leqq Q_1$ and $P_2 \leqq Q_2$) in FIG. 4(a).

First, similarly as in case of the above described conventional address generator, in Cycle 0, data indicating the start address SA is set by the start-address setting device 24 in the first and second accumulating registers 26-1 and 26-2 as an initial value. Next, in Cycle 1, the data held in the first accumulating register is added to the first increment DX corresponding to the first scanning direction (i.e., X-direction) by the adder 23, and a result of the addition is then written to the first accumulating register 26-1. Note that at that time, the result of the addition is not written to the second accumulating register 26-2. Thereafter, in each of Cycles 2 to ($P_1-1$), the same operation is repeatedly effected.

Next, in Cycle $P_1$, the data held in the second accumulating register 26-2 is added to the second increment DY corresponding to the second scanning direction (i.e., Y-direction) by the adder 23, and a result of the addition is written to both of the first accumulating register 26-1 and the second accumulating register 26-2.

Similarly, in each of Cycles ($P_1+1$) to ($2P_1-1$) and $\{(P_2 1)P_1+1\}$ to ($P_2P_1-1$), an addition of the data stored in the first accumulating register 26-1 to the first data DX is effected by the adder 23 and a result of the addition is written to the first accumulating register 26-1. Further, in each of Cycles $P_1$, $2P_1$, ... and ($P_2-1$)$P_1$ (namely, every $P_1$ cycles), the data held in the second accumulating register 26-2 is added to the second increment DY, and a result of the addition is then written to both of the first and second accumulating registers 26-1 and 26-2. Finally, a value indicated data held in the first accumulating register 26-1 obtained as a result of an operation effected in each of Cycles 0 to ($P_2-1$)$P_1$ is outputted therefrom as an address to currently be accessed.

Figure 4B:
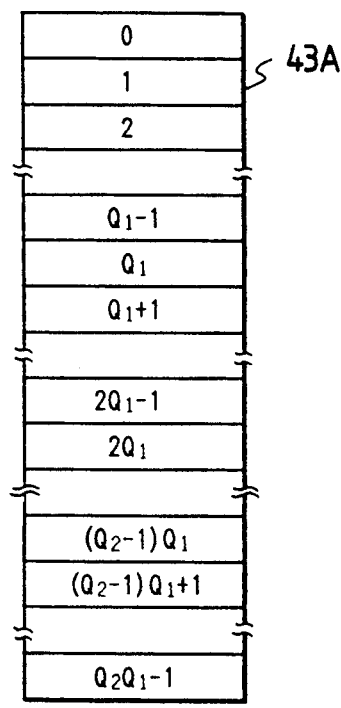
FIG. 4(b) is a diagram for illustrating a memory map of entire image data of FIG. 4(a) to be accessed.
Figure 4C:
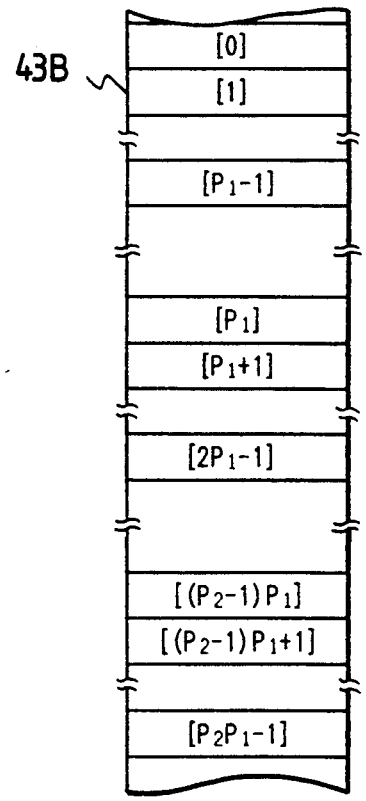
FIG. 4(c) is a diagram for illustrating a memory map of image data of a small rectangular region of FIG. 4(a)
Figure 5:
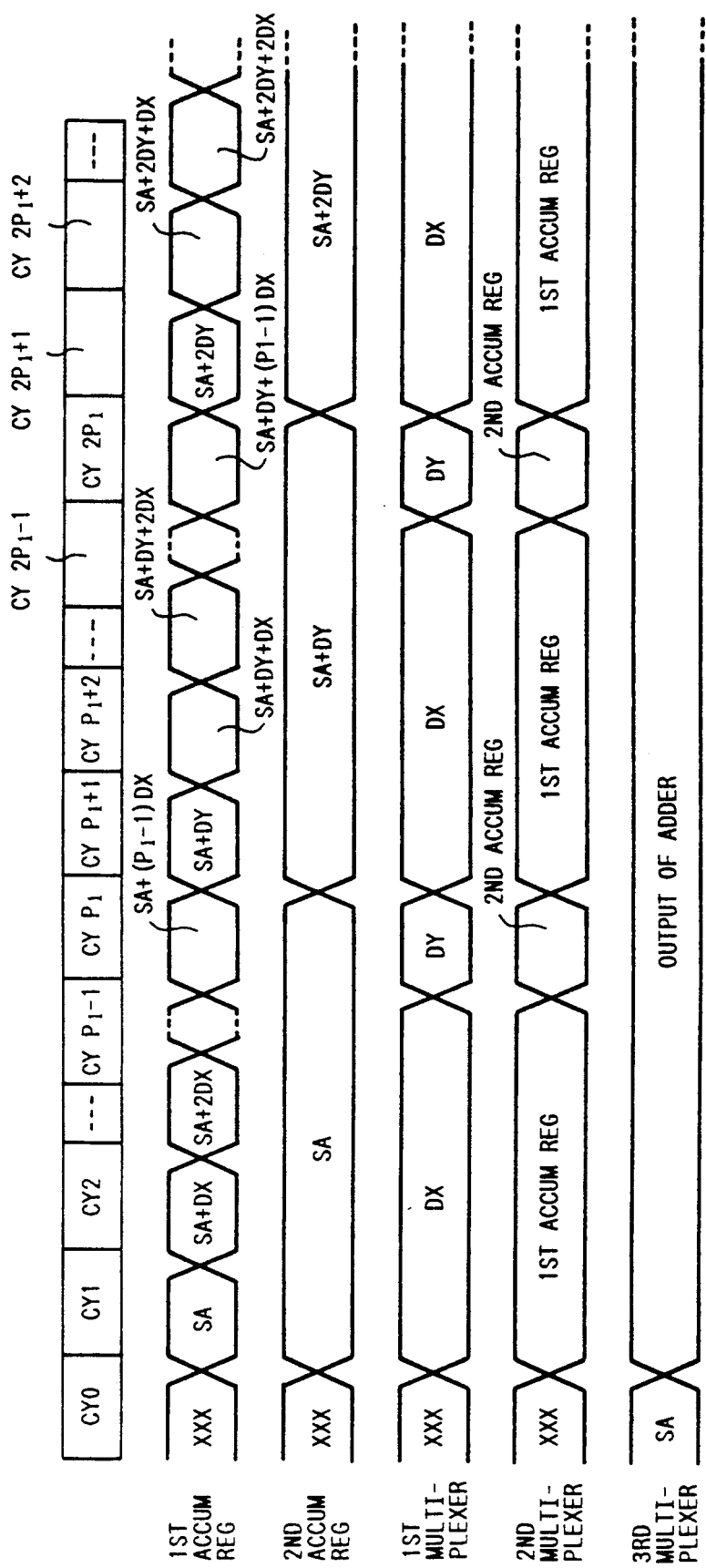
FIG. 5 is a timing chart for illustrating an operation of the two-dimensional address generator of FIG. 2.

Referring to FIG. 5, there is illustrated the data stored or selected in the cycles during the above-mentioned operation of the two-dimensional address generator. As illustrated in FIG. 5, an address assigned to a first data element (i.e., a first pixel of FIG. 4) of the next row or column to be accessed is stored is calculated by using an address of a first data element of the last accessed row or column stored in the second accumulating register 26-2.

Figure 11:
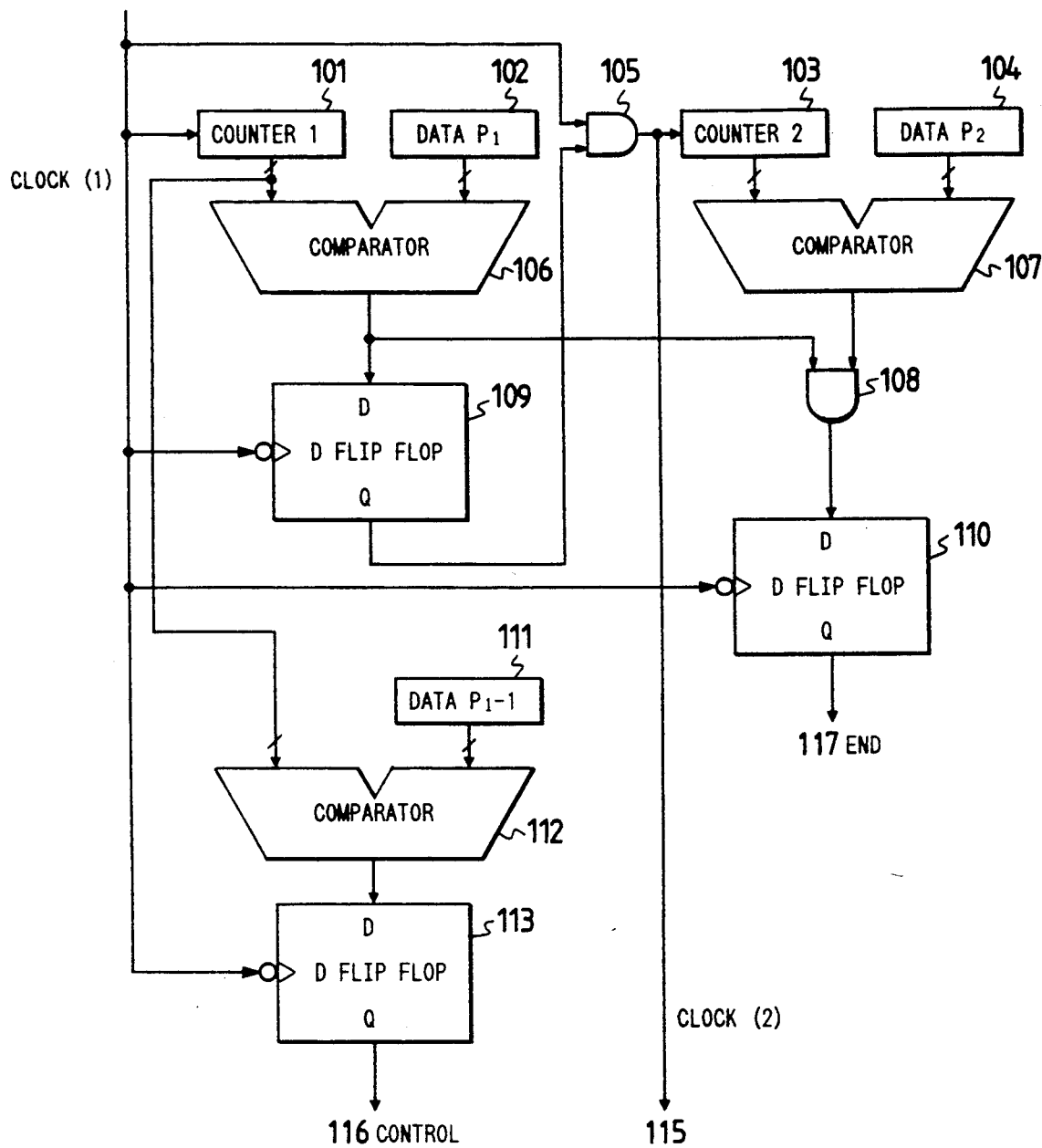
FIG. 11 is a schematic block diagram for showing the construction of an example of a control circuit according to the present invention for controlling a two-dimensional address generator.

Turning to FIG. 11, there is shown a practical example of the control circuit 28 of FIG. 2. In FIG. 11, reference numeral 101 denotes Counter 1 which is initially set to have a number $P_1$ in Cycle 0 and starts a counting operation in Cycle 1 and whose output is changed from 1 to $P_1$ by being incremented by one upon the reception of each clock pulse from Cycle 1 onward; 103 Counter 2 which is initially set to have a number $P_2$ in Cycle 0 (namely, at the time of activating the address generator) and starts a counting operation in Cycle 1 and whose output is changed from 1 to $P_1$ by being incremented by one every reception of $P_1$ clock pulses from Cycle 1 onward; 102 data indicating $P_1$; 104 data indicating $P_2$; 111 data indicating ($P_1-1$); 105 and 108 AND circuits; 106, 107 and 112 comparators each of which makes a comparison of two data and outputs 1 if matched but outputs 0 if not matched; 109, 110 and 113 D-type flip flops; 114 a clock signal (1); 115 a clock signal (2); 116 a control signal; and 117 and END signal.

Figure 12:
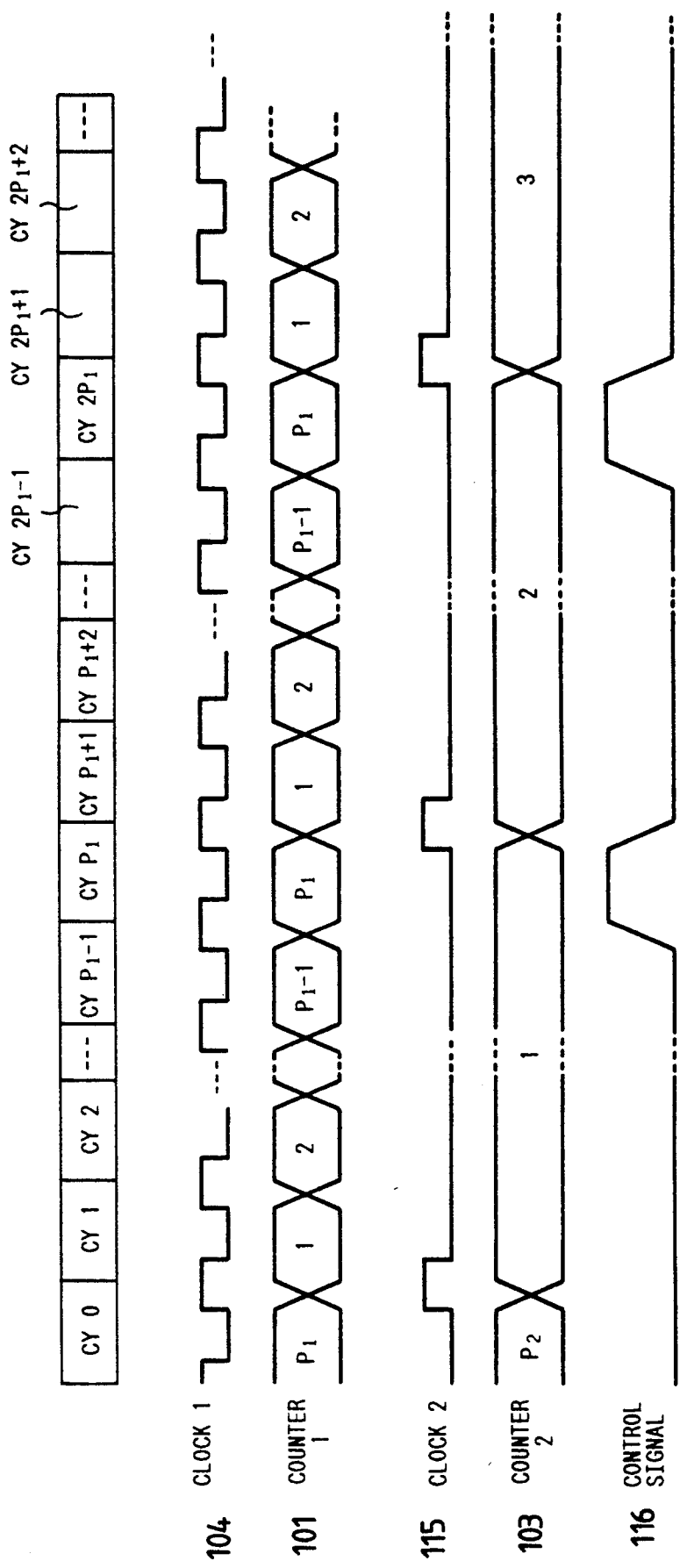
FIG. 12 is a timing chart for illustrating an operation of the control circuit of FIG. 11.

Referring next to FIG. 12, there is shown a timing chart illustrating an operation of the control circuit of FIG. 11. If the clock signal (1) 114 and the clock signal (2) 115 are used as the writing signal (1) 29-4 and the writing signal (2) 29-5, respectively, the address generator controlled by the control circuit of FIG. 11 can perform an operation in accordance with the timing chart shown in FIG. 5. Incidentally, the control signal (3) 29-3 for controlling the third multiplexer 27 is controlled in such a manner to make the third multiplexer 27 select the start address SA in Cycle 0 (at the time of activating the two-dimensional address generator) and select the output of the adder in the other cycles.

Next, a practical manner of accessing image data by using the above-mentioned two-dimensional address generator according to the present invention will be described hereinbelow by referring to FIG. 6(a). In passing, in FIG. 6(a), reference numeral 61 denotes entire image data of a rectangular region composed of $6 \times 7$ pixels; and 62 a rectangular region composed of $4 \times 4$ pixels to be accessed. Further, reference numerals 0 to 41 designate addresses of locations of a practical memory; and (0) to (15) orders of access to pixels. In this case, the first increment DX is set to be 1; and the second increment DY is 6 (namely, the number of pixels of one line).

In Cycle 0, a numerical value 7 is written to both of the first and second accumulating registers 26-1 ad 26-2 as the start address SA. Further, in each of Cycles 1 to 3, the first increment which is 1 in this case is added to the numerical value (7 in Cycle 1) stored in the first accumulating register 26-1, and a result of the addition is written to the register 26-1. In this manner, addresses 8, 9 and 10 are generated. Moreover, in Cycle 4, the second increment DY (i.e., 6 in this register) is added to the numerical value 7 stored in the second accumulating register 26-2, and a result of this addition is written to both of the first and second accumulating registers 26-1 and 26-2, so that the address 13 is generated. Further, in each of Cycles 5 to 7, the first increment DX (i.e., 1 in this case) is added to the numerical value held in the first accumulating register 26-1, so that the addresses 14, 15 and 16 are generated. Subsequently, in Cycle 8, the numerical value 6 is added as the second increment to the data stored in the second accumulating register 26-2, and a result of the addition is written to both of the first and second accumulating registers 26-1 and 26-2, so that the address 19 is generated.

Similarly, the addresses 20, 21, 22, 25, 26, 27 and 28 are generated in this order. Thus, all of the image data corresponding to the pixels of the rectangular region 62 in the entire image data 61 are accessed.

As can be understood from the foregoing description, FIG. 6(a) is a diagram for illustrating an operation of accessing image data of pixels from left to right in the horizontal direction, as viewed in the figure. In contrast with this, FIG. 6(b) is a diagram for illustrating an operation of accessing image data of pixels from top to bottom in the vertical direction, as viewed in the figure. Hereinafter, another practical manner of accessing image data by using the above-mentioned two-dimensional address generator according to the present invention will be described by referring to FIG. 6(b). In FIG. 6(b), reference numeral 63 designates entire image data of a rectangular region composed of $6 \times 7$ pixels; and 64 a rectangular region composed of $4 \times 4$ pixels to be accessed. Moreover, similarly as in FIG. 6(a), reference numerals 0 to 41 designate addresses of locations of a practical memory; and (0) to (15) orders of access to pixels. However, in this case, the first increment DY is 6; and the second increment DX is equal to the number of pixels of one line (i.e., 1 in this case).

In Cycle 0, a numerical value 7 is written to both of the first and second accumulating registers 26-1 ad 26-2 as the start address SA. Further, in each of Cycles 1 to 3, the first increment DY (i.e., 6 in this case) is added to the numerical value stored in the first accumulating register 26-1, and a result of the addition is written to the register 26-1. In this way, addresses 13, 19 and 25 are generated. Further, in Cycle 4,the second increment DX (i.e., 1 in this register) is added to the address held in the second accumulating register 26-2, and a result of the addition is written to both of the first and second accumulating registers 26-1 and 26-2, so that the address 8 is generated. Further, in each of Cycles 5 to 7, the first increment DX (i.e., 6) is added to the numerical value (8 in Cycle 5) held in the first accumulating register 26-1, so that the addresses 14, 20 and 26 are generated. Subsequently, in Cycle 8, the numerical value 1 is added as the second increment to the data stored in the second accumulating register 26-2, and a result of the addition is written to both of the first and second accumulating registers 26-1 and 26-2, so that the address 9 is generated.

Similarly, the addresses 15, 21, 27, 10, 16, 22 and 28 are generated in this order. Thus, all of the image data corresponding to the pixels of the rectangular region 64 in the entire image data 63 are accessed.

As described above, a direction in which pixels of the same rectangular region 62 (64) to successively be accessed are arranged can be changed between the horizontal and vertical directions by changing an increment, which is used for calculating addresses, between the first and second increments.

Apparently, by appropriately changing one or both of the first and second increments, a parallelogram region composed of pixels corresponding to addresses, e.g., 6, 7, 8, 13, 14, 15, 20, 21, 22, 27, 28 and 29 can successively be accessed. Moreover, pixels of an object region to be accessed can be accessed at intervals of a predetermined number of pixels or rows. In addition, even in case that entire data comprised of data elements to be accessed is defined in a multidimensional space having three or more dimensions, an object region of data elements having three or more dimensions can be similarly accessed.

Next, will be described hereinbelow another embodiment of the present invention in which an object area composed of 3×3 pixels to be accessed is shifted a predetermined number of times in a two-dimensional image, and image data of pixels included in the object area at an initial and shifted positions thereof are accessed. For example, an operation of accessing image data of 3×3 pixels of an object region, which is successively shifted two times from left to right in the horizontal direction as viewed in FIG. 7(a), at an initial position and shifted positions. In FIG. 7(a), reference numeral 71 represents entire image data of a rectangular region of 11×5 pixels; 72-1 a first object area (i.e., an object region at a initial position) of 3×3 pixels to be accessed; 72-2 a second object area (i.e., an object region at a first shifted position) of 3×3 pixels to be accessed; and 72-3 a third object area (i.e., an object region at a second shifted position) of 3×3 pixels to be accessed. Further, reference numerals 0 to 54 indicate addresses of locations of a practical memory; and (0) to (26) orders of access to pixels. Namely, first, image data of pixels corresponding to the orders (0) to (8) of access, which are included in the first object region, are accessed. Then, image data of pixels of the second object region, namely, pixels corresponding to the orders (9) to (17) are accessed. Finally, image data of pixels of the third object region, that is, pixels corresponding to the orders (18) to (26) are accessed.

Figure 8:
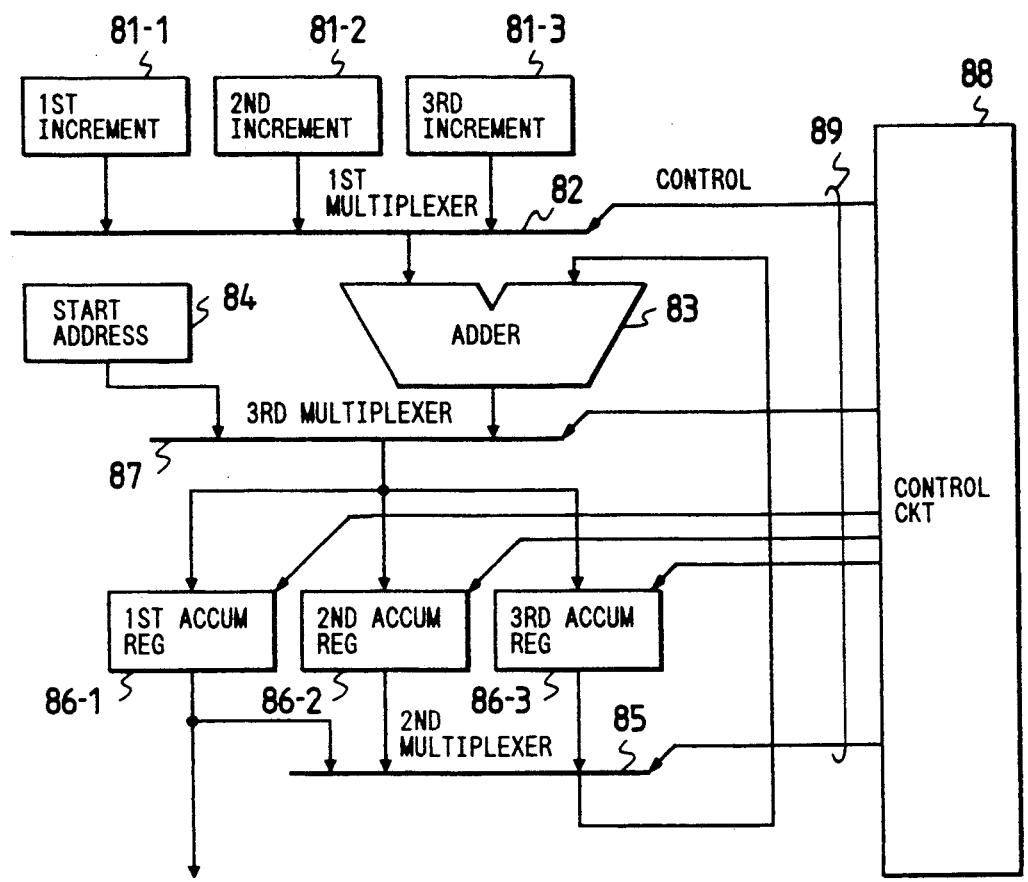
FIG. 8 is a schematic block diagram for showing the construction of an example of a three-dimensional address generator embodying the present invention.
Figure 10:
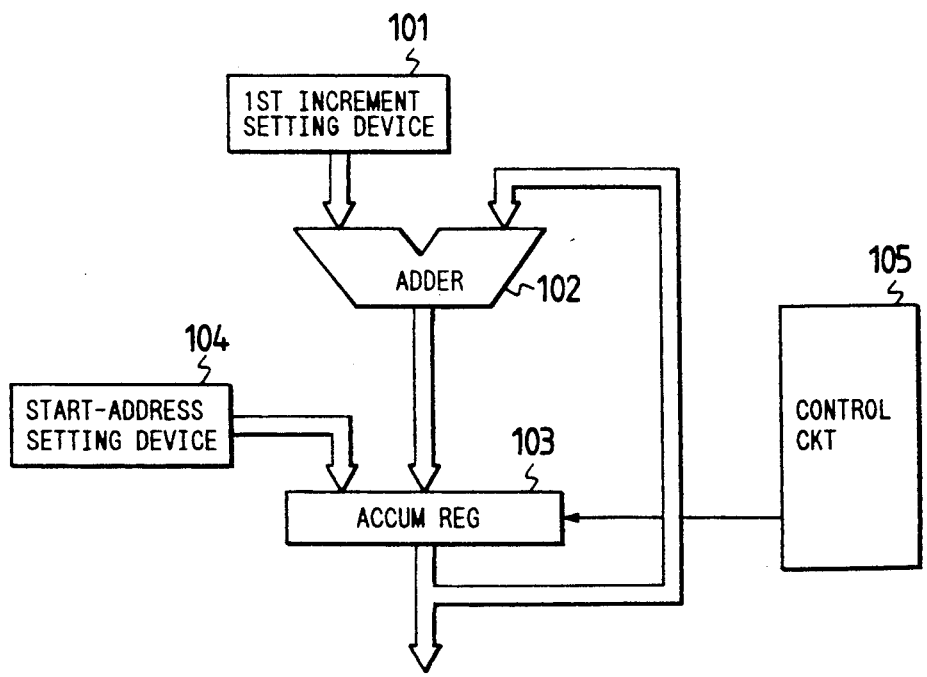
FIG. 10 is a schematic block diagram for showing the construction of an example of a conventional two-dimensional address generator.

In case of this embodiment, there are three scanning directions, namely, horizontal and vertical directions and a direction in which the object region is shifted, as viewed in FIG. 7(a). As a result of shifting the object region two times from an initial position thereof and accessing image data of pixels of the object region at the initial position and at the first and second shifted positions thereof, image data of 3×3×3 pixels of the three areas 72-1 to 72-3 are accessed. Such access to image data of 3×3×3 pixels can be achieved by using a three-dimensional address generator of FIG. 8. In FIG. 8, reference character 81-1 denotes a first increment setting device for setting a first increment corresponding to a first scanning direction therein; 81-2 a second increment setting device for setting a second increment corresponding to a second scanning direction therein; 81-3 a third increment setting device for setting a third increment corresponding to a third scanning direction therein; 82 a first multiplexer; 83 an adder; 84 a start-address setting device for setting a start-address therein; 85 a second multiplexer; 86-1 a first accumulating register; 86-2 a second accumulating register; 86-3 a third accumulating register; 87 a third multiplexer; 88 a control circuit; and 89 a control signal.

Hereinafter, an operation of this embodiment, which is similar to the above described operation of the two-dimensional address generator embodying the present invention, will be described by referring to FIG. 7(a). Incidentally, in this embodiment, the first increment is 1, and the second increment is equal to the number of data of one line (i.e., 11 in this case) and the third increment is equal to a shift amount of the object region composed of 3×3 pixels (i.e., 3 in this case). Further, an initial start address is 12.

First, in Cycle 0, the start-address data (i.e., the numerical value 12) is written to the first to third accumulating registers 86-1 to 86-3. Then, in each of Cycles 1 and 2, the first increment (i.e., 1 in this case) is added to the data (incidentally, 12 in Cycle 1) stored in the first accumulating register 86-1 and moreover a result of the addition is written to the register 86-1, so that the address 13 and 14 are generated. Subsequently, in Cycle 3, the second increment (11 in this case) is added to data (i.e., 12) stored in the second accumulating register 86-2, and a result of the addition is then written to both of the first and second accumulating registers 86-1 and 86-2, so that the address 23 is generated. Next, in each of Cycles 4 and 5, the numerical value (incidentally, 23 in Cycle 4) stored in the first accumulating register 86-1 is increased by 1 by adding the first increment thereto, and a result of the addition is written to the first accumulating register 86-1. Thus, the addresses 24 and 25 are generated. Further, in Cycle 6, the numerical value 11 (i.e., the second increment) is added to the data (i.e., 23) stored in the second accumulating register 86-2. A result of this addition is written to both of the first and second accumulating registers 86-1 and 86-2. In this manner, the address 34 is generated. Next, in each of Cycles 7 and 8, the first increment (i.e., 1) is added to the value (34 in Cycle 7) held in the first accumulating register 86-1, and a result of the addition is written to the register 86-1. Thus, the addresses 35 and 36 are generated. Furthermore, in Cycle 9, the third increment (i.e., 3) is added to the numerical value 12 held in the third accumulating register 86-3, and a result is written to all of the first to third registers 86-1 to 86-3, so that the address 15 is generated.

Similarly, in each of Cycles 10, 11, 13, 14, 16, 17, 19, 20, 22, 23, 25 and 26, the first increment (i.e., 1) is added to the value held in the first accumulating register 86-1 and a result is written to the register 86-1. Further, in Cycles 12, 15, 21 and 24, the second increment (i.e., 11) is added to the value stored in the second accumulating register 86-2, and a result is written to both of the first and second accumulating registers 86-1 and 86-2. Moreover, in Cycle 18, the third increment (i.e., 3) is added to the value stored in the third accumulating register 86-3 and a result of the addition is written to all of the first to third accumulating registers. Thus, the addresses 16, 17, 26, 27, 28, 37, 38, 39, 18, 19, 20, 29, 30, 31, 40, 41 and 42 are generated in this order. Consequently, access to image data of pixels of the first to third object areas 72-1, 72-2 and 72-3 in the entire image data 71 can be achieved.

FIG. 7(b) illustrates a case that the first object area overlaps with the second object area, and the second object area overlaps with the third object area, and further the object region is obliquely shifted in the entire image two times. Similarly as in case of FIG. 7(a), there are three scanning directions and consequently image data of $3 \times 3 \times 3$ pixels included in the three object areas 74-1 to 74-3 are accessed. Such access to the image data can be achieved by using the three-dimensional address generator of FIG. 8. Further, similarly as in case of FIG. 7(a), the first increment 81-1 is 1, and the second increment 81-2 is equal to the number of data of one line (i.e., 11), and the third increment 81-3 is equal to the shift amount of the object region to be accessed (i.e., 13). Furthermore, a numerical value 2 is initially set in the start-address setting device 84 as a start address. By performing an operation similar to the operation described by referring to FIG. 7(a), the access to the image data corresponding to pixels of the first to third object areas 74-1, 74-2 and 74-3 included in the entire image data 73 can be achieved.

Moreover, by using the three-dimensional address generator of FIG. 8, image data of pixels of a region of a practical three-dimensional image can be accessed. Furthermore, in case where entire data comprised of data elements to be accessed is defined in a multidimensional space having four or more dimensions, an object region of data elements having four or more dimensions can be similarly accessed.

Figure 3:
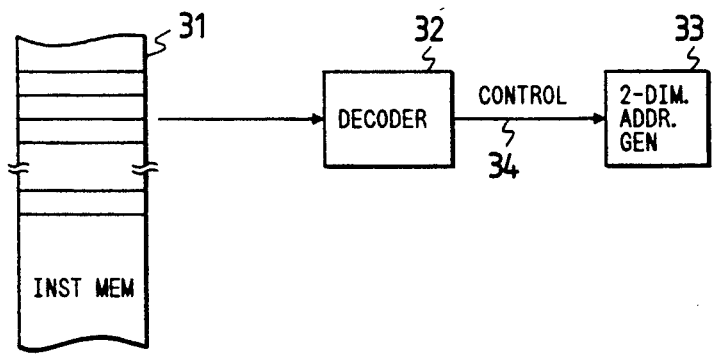
FIG. 3 is a schematic block diagram for showing the construction of an example of a control system for controlling a two-dimensional address generator embodying the present invention.

Referring next to FIG. 3, there is illustrated an example of a control system for controlling a multidimensional address generator according to the third aspect of the present invention. In FIG. 3, reference numeral 31 represents an instruction memory; 32 a decoder; 33 the two-dimensional address generator of FIG. 2; and 34 a control signal.

In this control system, the two-dimensional address generator of FIG. 2 is employed as a multidimensional address generator to be controlled. Further, an instruction read out of the instruction memory 31 is decoded by the decoder 32. If the decoded instruction is consequently detected as an instruction of a first mode, the decoder outputs a control signal which advances an operation of the two-dimensional address generator 33 by one cycle. In contrast, if the decoded instruction is detected as an instruction of a second mode, the decoder outputs another control signal which causes an operation of the two-dimensional address generator 33 not to advance to the next cycle.

Hereunder, will be described an example of an operation of the system, that is, an operation of repeatedly executing a sequence of the following three instructions:

(1) a memory reading instruction, which is an instruction of the second mode, of reading data stored at a location corresponding to an address indicated by an output of the two-dimensional address generator 33;

(2) an operation performing instruction of performing an operation on the read data; and (3) a memory writing instruction, which is an instruction of the first mode, of writing a result of the performed operation to a location corresponding to an address corresponding to an output of the two-dimensional address generator 33.

Figure 9:
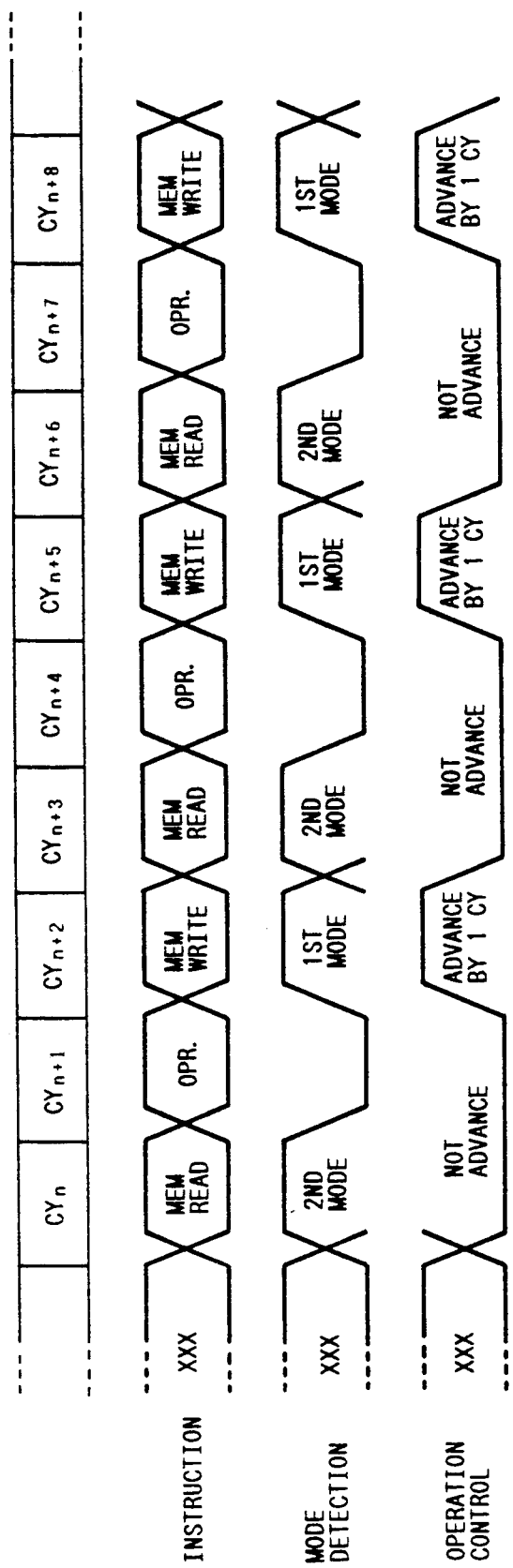
FIG. 9 is a timing chart for illustrating an operation of the three-dimensional address generator of FIG. 8.

Referring next to FIG. 9, there is shown a timing chart illustrating this operation of the system of FIG. 3. As is seen from this figure, in each of Cycles (n+2), (n+5) and (n+8) in which the first mode is detected by the decoder 32, the system controls the two-dimensional address generator 33 in such manner to progress the operation of the address generator 33 by one cycle. Further, in each of Cycles n, (n+3) and (n+6) in which the second mode is detected by the decoder 32, the system controls the two-dimensional address generator 33 in such a fashion not to make the operation of the two-dimensional address generator 33 advance to the next cycle. Thus, in couples of Cycles {n and (n+2)}, Cycles {(n+3) and (n+5){ and Cycles {(n+6) and (n+8)}, data stored at the same address generated by the two-dimensional address 33 can be used. Incidentally, in each of Cycles (n+1), (n+4) and (n+7), the two-dimensional address generator 33 is not used to execute the operation performing instruction and therefore the address generator 33 does not advance to the next cycle and output any data. Thus, the system can perform an operation on accessed data of a rectangular region and store a result of the operation at an address, at which the accessed data was originally stored, of a memory. Additionally, for instance, a thresholding operation of thresholding an image by extracting an object from the image, an operation of modifying a gray scale of a given image and a combination of such operations may be employed as the operation to be performed by executing the operation performing instruction.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A multidimensional address generator for generating one-dimensional addresses of a memory, which respectively correspond to $P_1 \times P_2 \times \ldots \times P_n$ data of a predetermined region of an N-dimensional entire data array (N is a positive integer larger than one) having $Q_1 \times Q_2 \times \ldots \times Q_n$ data stored in the memory ($P_1, P_2, \ldots$ and $P_n$ and $Q_1, Q_2 \ldots$ and $Q_N$ are positive integers and $P_1 \leq Q_1, P_2 \leq Q_2, \ldots$ and $P_N \leq Q_N$), one-dimensional addresses being assigned to the $Q_1 \times Q_2 \times \ldots \times Q_n$ data, said multidimensional address generator generating the one-dimensional addresses respectively corresponding to the $P_1 \times P_2 \times \ldots \times P_N$ data in a sequence of cycles denominated Cycles 0 to $(P_N P_{N-1} \ldots P_2 P_1 - 1)$ of a cyclic access operation of accessing the $P_1 \times P_2 \times \ldots \times P_N$ data stored in the memory, which operation is performed by a processor, said multidimensional address generator comprising:

first, second and third multiplexers;
an adder; and
first and second, ... to Nth accumulating registers, wherein said first multiplexer selects one of a first to Nth increments respectively corresponding to a first to Nth directions, in which data to successively be accessed are arranged, and said second multiplexer selects one of data stored in said first to Nth accumulating registers, and said third multiplexer selects between a start address and an output of said adder, wherein data selected by said first multiplexer is added by said adder to data selected by said second multiplexer, and data selected by said third multiplexer is inputted to said first to Nth accumulating registers, wherein a start address is written to said first to Nth accumulating registers in Cycle 0 when said address generator is activated, and the first increment is added to the data held in said first accumulating register in each of Cycles 1 to $(P_1-a)$ and Cycles $P_1+1$ to $(2P_1-1)$ and ... and Cycles $(P_N P_{N-1} \ldots P_2-1)P_1+1$ to $(P_N P_{N-1} \ldots P_2 P_1 - 1)$, and a result of the addition of the first increment to the data held in said first accumulating register is written to said first accumulating register, and an nth increment $(n=2, 3, \ldots, N)$ is added to the data held in an nth accumulating register, and a result of the addition of the nth increment to the data held in said nth accumulating register is written to said first to nth accumulating registers, every $P_{n-1} P_{n-2} \ldots P_1$ cycles during Cycles $P_n P_{n-1} P_{n-2} \ldots P_1$ to $(P_n-1) P_{n-1} P_{n-2} \ldots P_1$ and Cycles $(P_n+1) P_{n-1} P_{n-2} \ldots P_1$ to $(2P_n-1) P_{n-1} P_{n-2} \ldots P_1$ and Cycles $((P_N P_{N-1} \ldots P_{n+1}-1) P_n+1) P_{n-1} P_{n-2} \ldots P_1$ to $(P_N P_{N-1} \ldots P_{n+1} P_n - 1) P_{n-1} P_{n-2} \ldots P_1$, with regard to all possible values of n, and the data obtained in said first accumulating register as a result of an operation effected during Cycles 0 to $(P_N P_{N-1} \ldots P_2 P_1 - 1)$ is outputted.

2. A control system for controlling a multidimensional address generator for generating one-dimensional addresses of a memory, which respectively correspond to $P_1 \times P_2 \times \ldots \times P_n$ data of a predetermined region of an N-dimensional entire data array (N is a positive integer larger than one) having $Q_1 \times Q_2 \times \ldots \times Q_n$ data stored in the memory ($P_1, P_2, \ldots$ and $P_n$ and $Q_1, Q_2, \ldots$ and $Q_N$ are positive integers and $P_1 \leq Q_1$, $P_2 \leq Q_2, \ldots$ and $P_N \leq Q_N$), one-dimensional addresses being assigned to the $Q_1 \times Q_2 \times \ldots \times Q_n$ data, said multidimensional address generator generating the one-dimensional addresses respectively corresponding to the $P_1 \times P_2 \times \ldots \times P_N$ data in a sequence of cycles denominated Cycles 0 to $(P_N P_{N-1} \ldots P_2 P_1 - 1)$ of a cyclic access operation of accessing the $P_1 \times P_2 \times \ldots \times P_N$ data stored in the memory, which operation is performed by a processor, said multidimensional address generator comprising:

first, second and third multiplexers;
an adder; and
first and second, ... to Nth accumulating registers, wherein said first multiplexer selects one of a first to Nth increments respectively corresponding to a first to Nth directions, in which data to successively be accessed are arranged, and said second multiplexer selects one of data stored in said first to Nth accumulating registers, and said third multiplexer selects between a start address and an output of said adder, wherein data selected by said first multiplexer is added by said adder to data selected by said second multiplexer, and data selected by said third multiplexer is inputted to said first to Nth accumulating registers, wherein a start address is written to said first to Nth accumulating registers in Cycle 0 when said address generator is activated, and the first increment is added to the data held in said first accumulating register in each of Cycles 1 to $(P_1-a)$ and Cycles $P_1+1$ to $(2P_1-1)$ and ... and Cycles $(P_N P_{N-1} \ldots P_2-1)P_1+1$ to $(P_N P_{N-1} \ldots P_2 P_1 - 1)$, and a result of the addition of the first increment to the data held in said first accumulating register is written to said first accumulating register, and an nth increment $(n=2, 3, \ldots, N)$ is added to the data held in an nth accumulating register, and a result of the addition of the nth increment to the data held in said nth accumulating register is written to said first to nth accumulating registers, every $P_{n-1} P_{n-2} \ldots P_1$ cycles during Cycles $P_n P_{n-1} P_{n-2} \ldots P_1$ to $(P_n-1) P_{n-1} P_{n-2} \ldots P_1$ and Cycles $(P_n+1) P_{n-1} P_{n-2} \ldots P_1$ to $(2P_n-1) P_{n-1} P_{n-2} \ldots P_1$ and Cycles $((P_N P_{N-1} \ldots P_{n+1}-1) P_n+1) P_{n-1} P_{n-2} \ldots P_1$ to $(P_N P_{N-1} \ldots P_{n+1} P_n - 1) P_{n-1} P_{n-2} \ldots P_1$, with regard to all possible values of n, and the data obtained in said first accumulating register as a result of an operation effected during Cycles 0 to $(P_N P_{N-1} \ldots P_2 P_1 - 1)$ is outputted, said control system having a decoder for decoding an instruction and outputting a control signal to said multidimensional address generator, wherein if a decoded instruction is consequently detected as an instruction of a first mode, said decoder outputs a control signal which advances an operation of said multidimensional address generator by one cycle, and if the decoded instruction is detected as an instruction of a second mode, said decoder outputs another control signal which causes an operation of said multidimensional address generator not to advance to the next cycle.

3. A two-dimensional address generator for generating one-dimensional addresses of a memory, which respectively correspond to $P_1 \times P_2$ data of a predetermined region of a two-dimensional entire data array having $Q_1 \times Q_2$ data stored in the memory ($P_1, P_2, Q_1$ and $Q_2$ are positive integers and $P_1 \leq Q_1$ and $P_2 \leq Q_2$), one-dimensional addresses being assigned to the $Q_1 \times Q_2$ data, said two-dimensional address generator generating the one-dimensional addresses respectively corresponding to the $P_1 \times P_2$ data in a sequence of cycles denominated Cycles 0 to $(P_2 P_1 - 1)$ of a cyclic access operation of accessing the $P_1 \times P_2$ data stored in the memory, which operation is performed by a processor, said two-dimensional address generator comprising:

first, second and third multiplexers;
an adder; and
first and second accumulating registers, wherein
said first multiplexer selects one of a first and second increments respectively corresponding to a first and second directions, in which data to successively be accessed are arranged, and
said second multiplexer selects one of data stored in said first and second accumulating registers, and
said third multiplexer selects between a start address and an output of said adder, wherein
data selected by said first multiplexer is added by said adder to data selected by said second multiplexer, and
data selected by said third multiplexer is inputted to said first and second accumulating registers, wherein
a start address is written to said first and second accumulating registers in Cycle 0 when said address generator is activated, and
the first increment is added to the data held in said first accumulating register in each of Cycles 1 to $(P_1-1)$ and Cycles $(P_1+1)$ to $(2P_1-1)$ and ... and Cycles $(P_2-1)P_1+1$ to $(P_2P_1-1)$, and a result of the addition of the first increment to the data held in said first accumulating register is written to said first accumulating register, and
the second increment is added to the data held in said second accumulating register, and a result of the addition of the second increment to the data held in said second accumulating register is written to said first and second accumulating registers, every $P_1$ cycles during Cycles $P_1$ to $(P_2-1)P_1$, and
the data obtained in said first accumulating register as a result of an operation effected during Cycles 0 to $(P_2P_1-1)$ is outputted.

4. A three-dimensional address generator for generating one-dimensional addresses of a memory, respectively corresponding to $P_1 \times P_2 \times P_3$ data of a predetermined region of a three-dimensional entire data array which has $Q_1 \times Q_2 \times Q_3$ data stored in the memory ($P_1$, $P_2$ and $P_3$ and $Q_1$, $Q_2$ and $Q_3$ are positive integers and $P_1 \leq Q_1$, $P_2 \leq Q_2$ and $P_3 \leq Q_3$), one-dimensional addresses being assigned to the $Q_1 \times Q_2 \times Q_3$ data, said three-dimensional address generator generating the one-dimensional address respectively corresponding to the $P_1 \times P_2 \times P_3$ data in a sequence of cycles denominated Cycles 0 to $(P_3P_2P_1-1)$ of a cyclic access operation of accessing the $P_1 \times P_2 \times P_3$ data stored in the memory, which operation is performed by a processor, said three-dimensional address generator comprising:

first, second and third multiplexers;
an adder; and
first, second and third accumulating registers, wherein
said first multiplexer selects one of a first, second and third increments respectively corresponding to a first, second and third directions, in which data to successively be accessed are arranged, and
said second multiplexer selects one of data stored in said first, second and third accumulating registers, and
said third multiplexer selects between a start address and an output of said adder, wherein
data selected by said first multiplexer is added by said adder to data selected by said second multiplexer, and
data selected by said third multiplexer is inputted to said first, second and third accumulating registers, wherein
a start address is written to said first, second and third accumulating registers in Cycle 0 when said address generator is activated, and
the first increment is added to the data held in said first accumulating register in each of Cycles 1 to $(P_1-1)$ and Cycles $(P_1+1)$ to $(2P_1-1)$ and ... and Cycles $(P_3P_2-1)P_1+1$ to $(P_3P_2P_1-1)$, and a result of the addition of the first increment to the data held in said first accumulating register is written to said first accumulating register, and
the second increment is added to the data held in said second accumulating register, and a result of the addition of the second increment to the data held in said second accumulating register is written to said first and second accumulating registers, every $P_1$ cycles during Cycles $P_1$ to $(P_2-1)$ and Cycles $(P_2+1)P_1$ to $(2P_2-1)P_1$ and Cycles $((P_3-1)P_2+1)P_1$ to $(P_3P_2-1)P_1$, and
the third increment is added to the data held in said third accumulating register, and a result of the addition of the third increment to the data held in said third accumulating register is written to said first to third accumulating registers, every $P_2P_1$ cycles curing Cycles $P_2P_1$ to $(P_3-1)P_2P_1$, and
the data obtained in said first accumulating register as a result of an operation effected during Cycles 0 to $(P_3P_2P_1-1)$ is outputted.

* * * * *